United States Patent

[11] 3,594,017

| | | | |
|---|---|---|---|
| [72] | Inventor | Albert Grosseau Chavelle, France | |
| [21] | Appl. No | 808,082 | |
| [22] | Filed | Mar. 18, 1969 | |
| [45] | Patented | July 20, 1971 | |
| [73] | Assignee | Citroen S. A. (Automobiles Citroen, Berliet, Panhard) Paris, France | |
| [32] | Priority | Mar. 28, 1968 | |
| [33] | | France | |
| [31] | | 145,997 | |

[54] VEHICLE SUSPENSION
11 Claims, 3 Drawing Figs.

[52] U.S. Cl. .................................................. 280/124, 267/15
[51] Int. Cl. .................................................. B60g 9/00

[50] Field of Search............................................ 280/124; 267/57, 67, 15

[56] References Cited
UNITED STATES PATENTS
3,216,740  11/1965  Peras........................... 280/124

*Primary Examiner*—Philip Goodman
*Attorney*—Stevens, Davis, Miller and Mosher

ABSTRACT: On each side of the vehicle, a longitudinal arm carrying a wheel is mounted on a first transverse axle and a pendulous member rigidly carrying this axle is articulated to the chassis by the means of a second axle situated substantially in the vertical plane of the first axle; elastic means are interposed between the chassis and the arm. The two first axes (right side and left side) are rigidly interconnected by a rigid element.

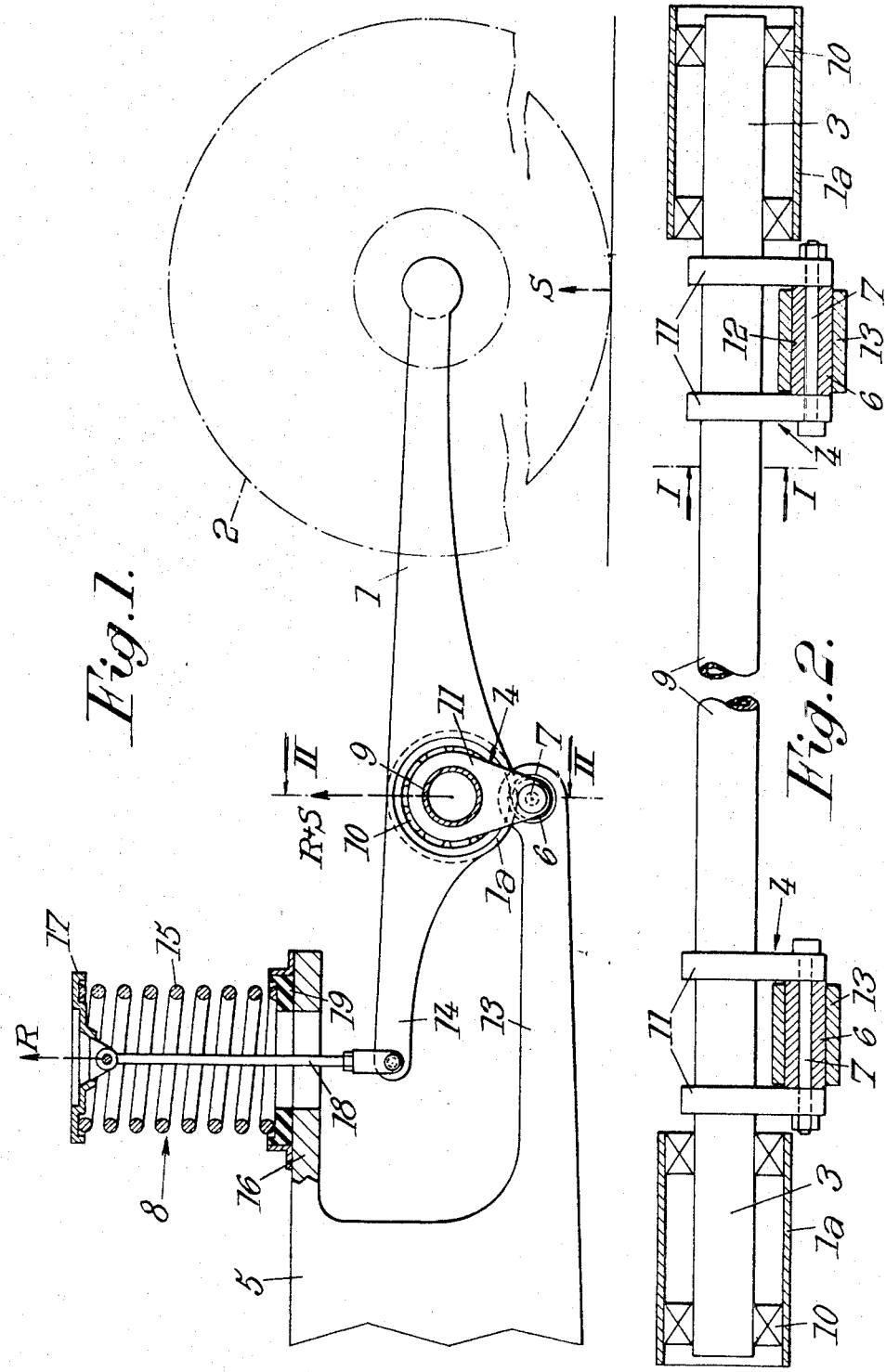

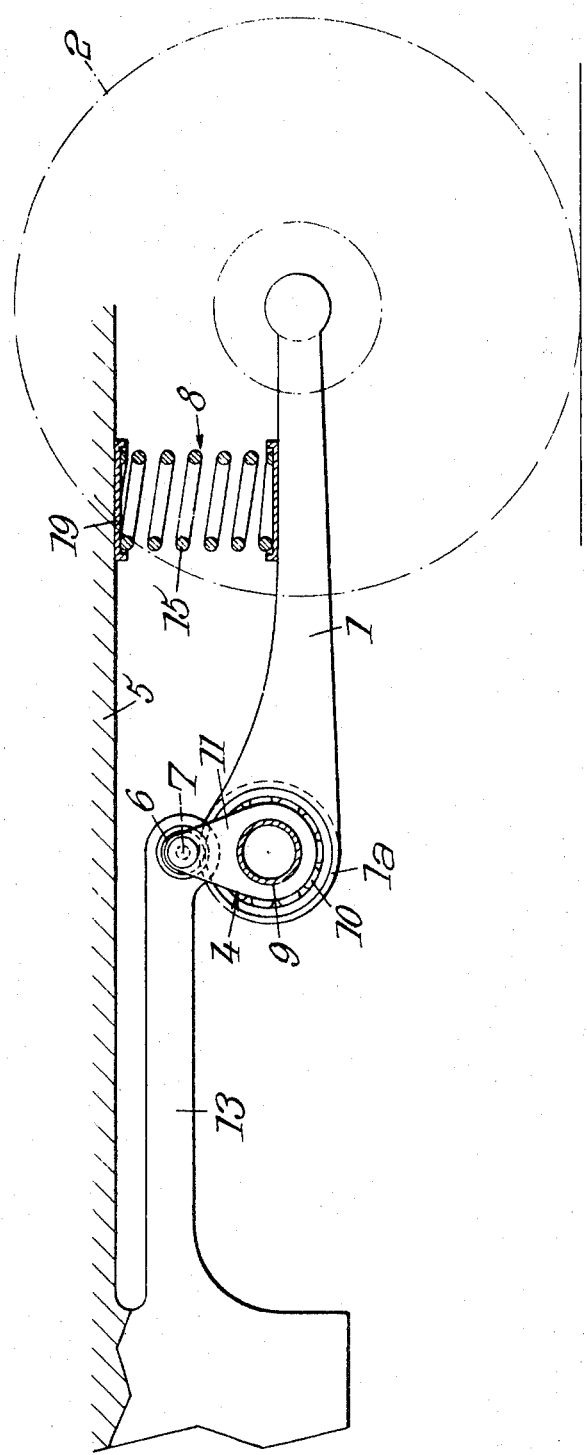

VEHICLE SUSPENSION

This invention relates to vehicle suspensions, in particular for the rear wheels.

The suspensions of the type in question comprise, on each side of the vehicle, a longitudinal arm for supporting a wheel, this arm being mounted on a first transverse axle, a pendulous member rigidly carrying this first transverse axle and mounted on the chassis of the vehicle, with the interposition of a bearing, by the means of a second transverse axle situated substantially in the vertical plane of the first transverse axle, and elastic means interposed between the chassis and the wheel-supporting arm to transmit to this arm the weight of the vehicle or the force of suspension, these elastic means being arranged to make the pendulous member work in traction.

In the present specification and claims, the word "chassis" has a broad meaning, and can be a frame and/or another structurally resistant part of the vehicle.

An object of this invention is to provide a suspension which, while ensuring the transverse rigidity of the suspension, can be put in position quite precisely with respect to the chassis of the vehicle.

With this in mind, a suspension of the type in question is characterized, according to this invention, by the fact that a rigid connection element rigidly interconnects the first transverse axle on the right with the one on the left, and consequently, the pendulous member on the right with the one on the left.

The invention will be well understood with the aid of the following complementary description, as well as of the accompanying drawings, which complementary description and drawings are merely given by way of example.

FIGS. 1 and 2 of the drawings show a suspension established according to a first embodiment of the invention, respectively in section through the vertical longitudinal plane I–I of FIG. 2 and through the vertical transverse plane II–II of FIG. 1; and FIG. 3 shows, in a similar manner to FIG. 1, a suspension constructed according to a second embodiment of the invention.

The following description relates to a suspension for the rear wheels of an automobile vehicle.

With regard to the suspension as a whole, it is arranged in any appropriate manner such that it comprises, on each side of the vehicle:

a longitudinal arm 1, carrying a wheel 2 at its free end and mounted on a first transverse axle 3;

a pendulous member 4 rigidly carrying the first transverse axle 3 and mounted on the chassis 5 of the vehicle with the interposition of a bearing 6 by the means of a second transverse axle 7 situated substantially in the vertical plane of the axle 3;

and elastic means 8 interposed between the chassis 5 and the arm 1 to transmit to this arm the weight of the vehicle, these elastic means 8 being arranged to make the pendulous member 4 work in traction.

Such a construction, applied independently to each of the arms 1, permits longitudinal movement of these arms in response to the reactions of the ground, and has the advantage of attenuating the vibrations and shocks transmitted to the body, due to the presence of a supplementary articulation. Nevertheless, by reason of the deformability of the anchorages and of the bearings 6, each axle 3 can oscillate independently of the other under the action of lateral forces; the wheel then no longer remains parallel to the longitudinal plane of the vehicle (which is prejudicial to the road holding and increases the wear on the tires).

In order to remedy this disadvantage without overly stiffening the anchorages, in accordance with this invention, a rigid connection element 9 rigidly interconnects the two axles 3, namely the right-hand axle and the left-hand axle, and consequently, the two pendulous members 4, namely the right-hand pendulous member and the left-hand pendulous member. Advantageously the connection element 9 is constituted by a transverse tube, and the axles 3 are constituted by the ends of this element, the arms 1 being mounted on these ends by the means of ball bearings 10 (or any other means) which are disposed inside hub 1a forming part of the arm 1. In this manner, the element 9 plays the role of a principal brace for the rear suspension.

With regard to the pendulous members 4, they are disposed on the element 9 in the neighborhood of the arms 1—in a manner to obtain a maximum separation between these pendulous members 4—either between the arms 1, as is the case in FIG. 2, or outside these arms 1. Each pendulous member can be constituted by two flanges 11 rigidly connected to the element 9 and rigidly carrying the axle 7, and the bearing 6 can be mounted inside a housing 12 formed in a support 13 rigid with the chassis 5. The supports 13, situated on opposite sides of the chassis, thus constitute the anchorage points for the rear suspension.

According to the embodiment of FIGS. 1 and 2, the elastic means 8 act, on each side of the vehicle, on a suspension lever 14 rigid with the arm 1 and disposed on the opposite side (in the longitudinal, not the transverse, direction) of the hub 1a from the arm 1, and the axle 7 is situated below the axles 3 of the arms 1. In order that these elastic means 8 can be constituted, for example, by a compression spring 15 resting by its lower part on a support 16 rigid with the chassis 5, a traction rod 18 (i.e. a rod 18 working in traction) is interposed between a cap 17 resting on the upper part of the spring 15 and the free end of the lever 14. Preferably, between the spring 15 and the support 16 there is provided an insulating cup 19, such a cup can also be interposed under the cap 17, this insulating cup 19 serving to absorb vibrations.

Whatever embodiment is adopted, stops (not shown) can be carried by the chassis 5 for limiting the longitudinal movement of the suspension, although the pronounced self-stabilizing characteristic of the suspension described generally permits the use of such stops to be avoided.

The operation of this suspension is the following.

On the one hand, under the action of the vertical forces applied to the suspension, the arms 1 oscillate in the usual manner, thus ensuring a certain filtration of the vibrations at the level of the insulating cups 19. On the other hand, the various longitudinal forces originating during the travel of the vehicle are absorbed by the relative displacement of the transverse element 9 supporting the wheel-carrying arms 1, this displacement being rendered possible by the presence of the axles 7.

Such a suspension has numerous advantages, among which can be cited:

an undeformable geometry between the arms 1 which is obtained by the use of a single transverse element 9 ensuring the pivoting of the wheel-carrying arms 1 and their rigid connection which guarantees that the trajectory will be respected;

a disposition of the axles 7 in the neighborhood of the ends of the single transverse element 9, conferring on the suspension a very slight sensitivity to the effects of turning of the vehicle;

an increased facility of mounting and dismounting the complete rear suspension which can be prepared in advance and then anchored at two points (supports 13).

The embodiment of FIGS. 1 and 2 presents the following particular advantages in addition:

self-stabilization of the suspended masses by the low disposition of the axles 7 with respect to the axles 3 of the wheel-carrying arm 1;

high efficiency of the self-stailizing qualities by the cumulation of the reactions R (of the suspension) and S (of the ground) at the transverse element 9 (see FIG. 1).

Needless to say, many changes and modifications are possible without departing from the spirit or scope of this invention. Thus, for example, as shown in FIG. 3, in one such modification, the elastic means 8 can act, on each side of the vehicle, directly between the chassis 5 and the part of the arm 1 which is comprised between the axle of the wheel 2 and the hub 1a, the axle 7 being situated above the element 9. These elastic means 8 are also constituted essentially by a compression spring 15 which can rest on the chassis 5 by the means of an insulating, that is to say, a vibration-absorbing cup 19.

The bearings 6 can be realized in an economic manner by using bushings made of elastic material.

What i claim is:

1. Vehicle suspension, comprising, on each side (namely the right side and the left side) of the vehicle,
   a longitudinal arm for supporting a wheel,
   a first transverse axle, on which said longitudinal arm is mounted,
   a pendulous member rigidly carrying said first transverse axle,
   a second transverse axle carried by said pendulous member and situated substantially in the same vertical plane as said first transverse axle,
   a bearing carried by the chassis of the vehicle and cooperating with said second transverse axle, which is mounted therein, whereby said pendulous member is mounted on the chassis by the means of said second transverse axle and said bearing,
   and elastic means interposed between the chassis and said longitudinal arm for transmitting to said arm the force of suspension due to the weight of the vehicle, said elastic means making said pendulous member work in traction,
   and said vehicle suspension further comprising, common to both sides of the vehicle, a rigid connection element rigidly interconnecting the first transverse axle on the right side with the first transverse axle on the left side, and consequently rigidly interconnecting the pendulous member on the right side with the pendulous member on the left side.

2. Vehicle suspension according to claim 1, wherein said rigid connection element is constituted essentially by a transverse tube and each first axle is respectively constituted essentially by an end of said rigid connection element.

3. Vehicle suspension according to claim 1, further comprising, on each side of the vehicle, a hub disposed in the forming part of said longitudinal arm, and a bearing mounted inside said hub and also mounted on said first transverse axle, each first transverse axle being formed by the corresponding end of said rigid connection element, whereby said arms are mounted on the ends of said rigid connection element by means of the bearings mounted inside the hubs of said arms.

4. Vehicle suspension according to claim 2, wherein said pendulous members are respectively disposed on the rigid connection element in the neighborhood of the arms.

5. Vehicle suspension according to claim 2, wherein each pendulous member is constituted essentially by two flanges rigidly connected to the rigid connection element and rigidly carrying the corresponding second axle.

6. Vehicle suspension according to claim 3, further comprising, on each side of the vehicle, a suspension lever rigidly connected with the arm and disposed on the opposite side—in the longitudinal direction—of the hub from the arm, said elastic means acting on said suspension lever, and the second axle being situated below the rigid connection element.

7. Vehicle suspension according to claim 6, wherein said elastic means are essentially constituted by a compression spring resting by its lower part on a support rigidly connected to the chassis, a traction rod being interposed between a cap resting on the upper part of said spring and the free end of said suspension lever.

8. Vehicle suspension according to claim 3, wherein, on each side of the vehicle, said elastic means act directly between the chassis and a part of said arm which is comprised between the axle of the wheel and the hub of the arm, the second axle being situated above the rigid connection element.

9. Vehicle suspension according to claim 1, wherein said elastic means are essentially constituted by a spring, said spring resting on the chassis by a vibration-absorbing cup.

10. Vehicle suspension according to claim 1, further comprising stops carried by the chassis for limiting the longitudinal movement of the arms.

11. Vehicle suspension according to claim 1, wherein each said bearing is constituted essentially by a bushing made of elastic material.